US010831543B2

(12) United States Patent
Chandramoorthy et al.

(10) Patent No.: US 10,831,543 B2
(45) Date of Patent: Nov. 10, 2020

(54) CONTENTION-AWARE RESOURCE PROVISIONING IN HETEROGENEOUS PROCESSORS

(71) Applicant: INTERNATIONAL BUSINESS MACHINES CORPORATION, Armonk, NY (US)

(72) Inventors: Nandhini Chandramoorthy, Yorktown Heights, NY (US); Karthik V. Swaminathan, Mount Kisco, NY (US); Ramon Bertran Monfort, New York, NY (US); Alper Buyuktosunoglu, White Plains, NY (US); Pradip Bose, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 16/194,252

(22) Filed: Nov. 16, 2018

(65) Prior Publication Data

US 2020/0159586 A1 May 21, 2020

(51) Int. Cl.
*G06F 9/50* (2006.01)
*G06F 9/48* (2006.01)

(52) U.S. Cl.
CPC .............. *G06F 9/5027* (2013.01); *G06F 9/48* (2013.01); *G06F 9/4806* (2013.01);
(Continued)

(58) Field of Classification Search
CPC .......... G06F 9/5027; G06F 9/455; G06F 9/48; G06F 9/50; G06F 9/5005; G06F 9/4806; G06F 9/4843; G06F 9/4881
See application file for complete search history.

(56) References Cited

U.S. PATENT DOCUMENTS 10,021,711 B2    7/2018  Krishnamoorthy et al.
2004/0186864 A1*  9/2004  Hsu ........................ G06F 9/5011
                                                  708/100
(Continued)

OTHER PUBLICATIONS

Salehi, M. A., "Contention-Aware Resource Provisioning in Interconnected Grid Computing Systems", Ph.D. Thesis, The University of Melbourne (2012); 192 pgs (Part 1, 48 pgs).
(Continued)

*Primary Examiner* — Charles M Swift
(74) *Attorney, Agent, or Firm* — Intelletek Law Group, PLLC; Gabriel Daniel, Esq.

(57) ABSTRACT

Applications on different processing elements have different characteristics such as latency versus bandwidth sensitivity, memory level parallelism, different memory access patterns and the like. Interference between applications due to contention at different sources leads to different effects on performance and is quantified. A method for contention-aware resource provisioning in heterogeneous processors includes receiving stand-alone performance statistics for each processing element for a given application. Multi-core performance slowdown can be computed from the received stand-alone performance statistics. When a request to provision an application on the heterogeneous processors is received, application performance requirements of the application can be determined and a bandwidth for the application can be provisioned based on the application performance requirements and the computed multi-core performance slowdown parameter.

18 Claims, 6 Drawing Sheets

(52) U.S. Cl.
CPC .......... *G06F 9/4843* (2013.01); *G06F 9/4881* (2013.01); *G06F 9/50* (2013.01); *G06F 9/5005* (2013.01)

(56) References Cited

U.S. PATENT DOCUMENTS

| | | | | |
|---|---|---|---|---|
| 2009/0064167 A1* | 3/2009 | Arimilli | ................... | G06F 9/522 718/105 |
| 2009/0165007 A1* | 6/2009 | Aghajanyan | .......... | G06F 9/4881 718/103 |
| 2013/0042252 A1* | 2/2013 | Jalal | ....................... | G06F 13/374 718/104 |
| 2013/0114421 A1* | 5/2013 | Qian | ................... | H04L 43/0852 370/252 |
| 2014/0122801 A1* | 5/2014 | Loh | ..................... | G06F 13/1663 711/118 |
| 2015/0350055 A1* | 12/2015 | Hyser | ................... | G06F 9/5088 709/224 |
| 2016/0098292 A1* | 4/2016 | Boutin | .................. | G06F 9/4881 718/104 |
| 2016/0017956 A1 | 6/2016 | Ganguli et al. | | |
| 2016/0179560 A1* | 6/2016 | Ganguli | .............. | G06F 11/3442 718/1 |
| 2016/0182345 A1* | 6/2016 | Herdrich | ............... | G06F 12/084 709/224 |
| 2016/0328273 A1 | 11/2016 | Molka et al. | | |
| 2017/0126580 A1* | 5/2017 | Lo | ....................... | H04L 41/0631 |
| 2017/0185438 A1* | 6/2017 | Thomas | .............. | G06F 9/45558 |
| 2018/0004456 A1* | 1/2018 | Talwar | .................... | G06F 3/067 |
| 2018/0088985 A1* | 3/2018 | Blaine | ................... | G06F 9/4893 |
| 2018/0113965 A1* | 4/2018 | Harris | ................... | G06F 9/5066 |
| 2020/0104230 A1* | 4/2020 | Hasija | ................. | G06F 11/3419 |

OTHER PUBLICATIONS

Salehi, M. A., "Contention-Aware Resource Provisioning in Interconnected Grid Computing Systems", Ph.D. Thesis, The University of Melbourne (2012); 192 pgs (Part 2, 48 pgs).

Salehi, M. A., "Contention-Aware Resource Provisioning in Interconnected Grid Computing Systems", Ph.D. Thesis, The University of Melbourne (2012); 192 pgs (Part 3, 48 pgs).

Salehi, M. A., "Contention-Aware Resource Provisioning in Interconnected Grid Computing Systems", Ph.D. Thesis, The University of Melbourne (2012); 192 pgs (Part 4, 48 pgs).

Anonymous, "Scalable Performance Optimized RDMA Detailed Statistics", ip.com, Jul. 10, 2013, 8 pgs.

IBM, "Factoring Contention in to the Priority Calculation by the Kernel", ip.com, May 20, 2003, 3 pgs.

Molka, K. et al., "Energy-Efficient Resource Allocation and Provisioning for In-Memory Database Clusters", IFIP Networking 2017 Conference and Workshops, Jun. 2017, 9 pgs.

* cited by examiner

CONTENTION-AWARE RESOURCE PROVISIONING IN HETEROGENEOUS PROCESSORS

STATEMENT REGARDING FEDERALLY SPONSORED RESEARCH OR DEVELOPMENT

This application was made with government support under HR0011-13-C-0022 awarded by Defense Advanced Research Projects Agency (DARPA). The government has certain rights to this invention.

BACKGROUND

Technical Field

The present disclosure generally relates to systems and methods for the management of shared resources, and more particularly, to a system and method for contention-aware resource provisioning in heterogeneous systems to minimize contention.

Description of the Related Art

Current and future generations of processors are designed with a large number of general-purpose core clusters, custom accelerators and general processing units (GPUs) with shared memory hierarchies. Applications on different processing elements (PEs) have different memory characteristics, access patterns and performance requirements. In order to compute performance in such a heterogenous system, the system typically abstracts the compute core model and studies the impact of shared system resources, such as interconnects, memory controllers and memories.

SUMMARY

According to an embodiment of the present disclosure, a method for contention-aware resource provisioning in heterogeneous processors includes receiving stand-alone performance statistics for each processing element for a given application. One or more multi-core performance slowdown parameters can be computed from the received stand-alone performance statistics.

When a request to provision an application on the heterogeneous processors is received, performance requirements of the application can be determined and a bandwidth for the application can be provisioned based on the application performance requirements and the computed one or more multi-core performance slowdown parameters.

In some embodiments, the provisioning of the bandwidth for the application includes forming transaction queues of different service rates for each of the processing elements.

In some embodiments, the method further includes estimating contention delay in the presence of i cores by computing input arrival rates using total cycles of i−1 cores.

In some embodiments, the method further includes estimating queuing delay in each queue and adding the queuing delay from each queue a stand-alone execution time in cycles.

In some embodiments, the collecting of performance statistics includes standalone performance statistics.

In some embodiments, collecting performance statistics includes dynamically collecting at least one of CPU-alone and accelerator-alone statistics.

In some embodiments, the method further includes estimating performance for each processing element by including contention delay at memory controllers in all nodes, multi-processor and local interconnects and accelerator interconnects.

In some embodiments, service rates of a particular CPU core or accelerator alone at an interconnect and a memory controller are fixed at a maximum for a time quantum for each scheduling time interval.

In some embodiments, the method further includes dynamically apportioning shared resource bandwidth based on application performance requirements and estimated slow-down due to contention.

According to another embodiment of the present disclosure, a contention control unit includes a monitor configured to collect performance statistics for each processing element for a given application, a performance estimator configured to compute one or more multi-core performance slowdown parameters from single-core performance statistics collected by the monitor, and a resource allocator configured to provision bandwidth based on performance requirements of an application running on a system using the contention control unit and the computed one or more multi-core performance slowdown parameters.

According to a further embodiment of the present disclosure, a computer program product for contention-aware resource provisioning in a heterogeneous processor is provided. The computer program product includes a computer readable storage medium having program instructions embodied therewith. The program instructions, executable by a contention control unit, cause the contention control unit to receive stand-alone performance statistics for each processing element for a given application. One or more multi-core performance slowdown parameters can be computed from the received stand-alone performance statistics. When a request to provision an application on the heterogeneous processors is received, application performance requirements of the application can be determined and a bandwidth for the application can be provisioned based on the application performance requirements and the computed one or more multi-core performance slowdown parameters.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods for the dynamic management of shared resources in heterogeneous systems to minimize contention. As used herein, the term "shared resources" refers to resources, such as graphics processing units, accelerators, shared memory, shared cache and the like.

Applications on different processing elements have different characteristics such as latency vs. bandwidth sensitivity, memory level parallelism, different memory access patterns and the like. Interference between applications due to contention at different sources leads to different effects on performance and should be quantified. Shared resources are dynamically apportioned such that applications still meet performance requirements, particularly accelerators for real-time computation. Thus, contention-aware scheduling is useful for maximizing system throughput and bandwidths in all interconnects and memory controllers can be intelligently shared to meet performance requirements.

In some embodiments, a hardware apparatus can monitor shared memory and other systems resources, estimate performance slow-down in each processing element, and allocate shared resources as per application requirements to maximize throughput. Management of the shared resources at a global level can enable the system to mitigate contention to a level not possible with local arbitration modules.

Methods of the present disclosure can estimate performance in multi-core, multi-accelerator systems from single core standalone performance statistics by analyzing the global effects of contention across all shared resources in the system. The method can dynamically apportion shared resource bandwidth, including interconnects to memory controllers and shared caches, and memory controllers, based on application characteristics and estimates slow-down due to contention. The methods of the present invention can be based on highly accurate analytical models, such as fundamental queuing models, which can be implemented in an energy-efficient, scalable manner in the hardware.

Figure 1:
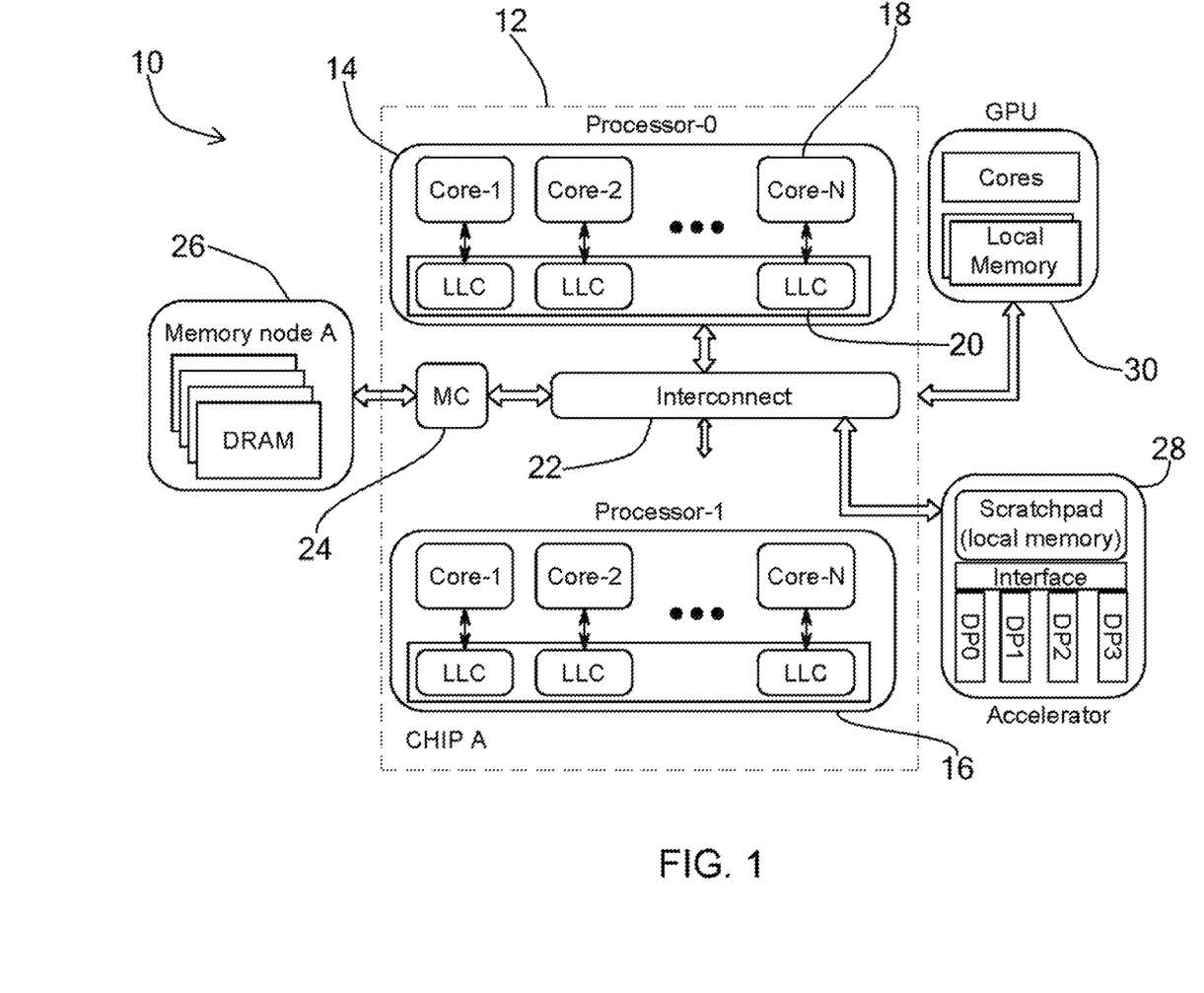
FIG. 1 is a schematic representation of a system architecture usable with systems and methods according to embodiments of the present disclosure.
Figure 2:
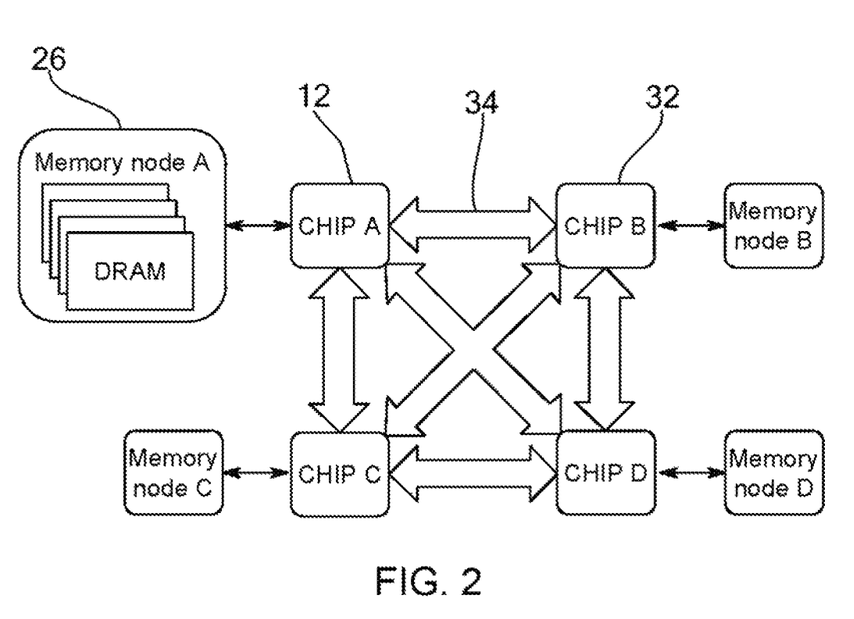
FIG. 2 is a schematic representation illustrating inter-processor interconnects and memory access patterns.

Referring to FIGS. 1 and 2, a system architectural configuration 10 is shown where a chip 12 can include a first processor 14 and a second processor 16, designated Processor-0 and Processor-1, respectively. Each processor 14, 16 can include a plurality of cores 18, designated from Core-1 to Core-N. The cores 18 may communicate with a last level cache 20 (LLC), as shown.

An interconnect 22 may provide communication between the processors 14, 16 and to a memory controller (MC) 24. External to the chip, 12, the memory controller 24 may communicate with a memory node 26, designated Memory node A. The interconnect 22 may communicate, external to the chip 12, to an accelerator 28 and a general processing unit (GPU) 30.

FIG. 2 illustrates how multiple chips, such as chip 12, may communicate with other chips 32 via one or more inter-processor interconnects 34. As discussed in greater detail below, embodiments of the present disclosure describe how the interconnects, such as interconnect 22 and inter-processor interconnect 34, and how the memory controllers, such as memory controller 24, are intelligently shared to meet performance requirements while contention, such as memory contention, is minimized.

Figure 3:
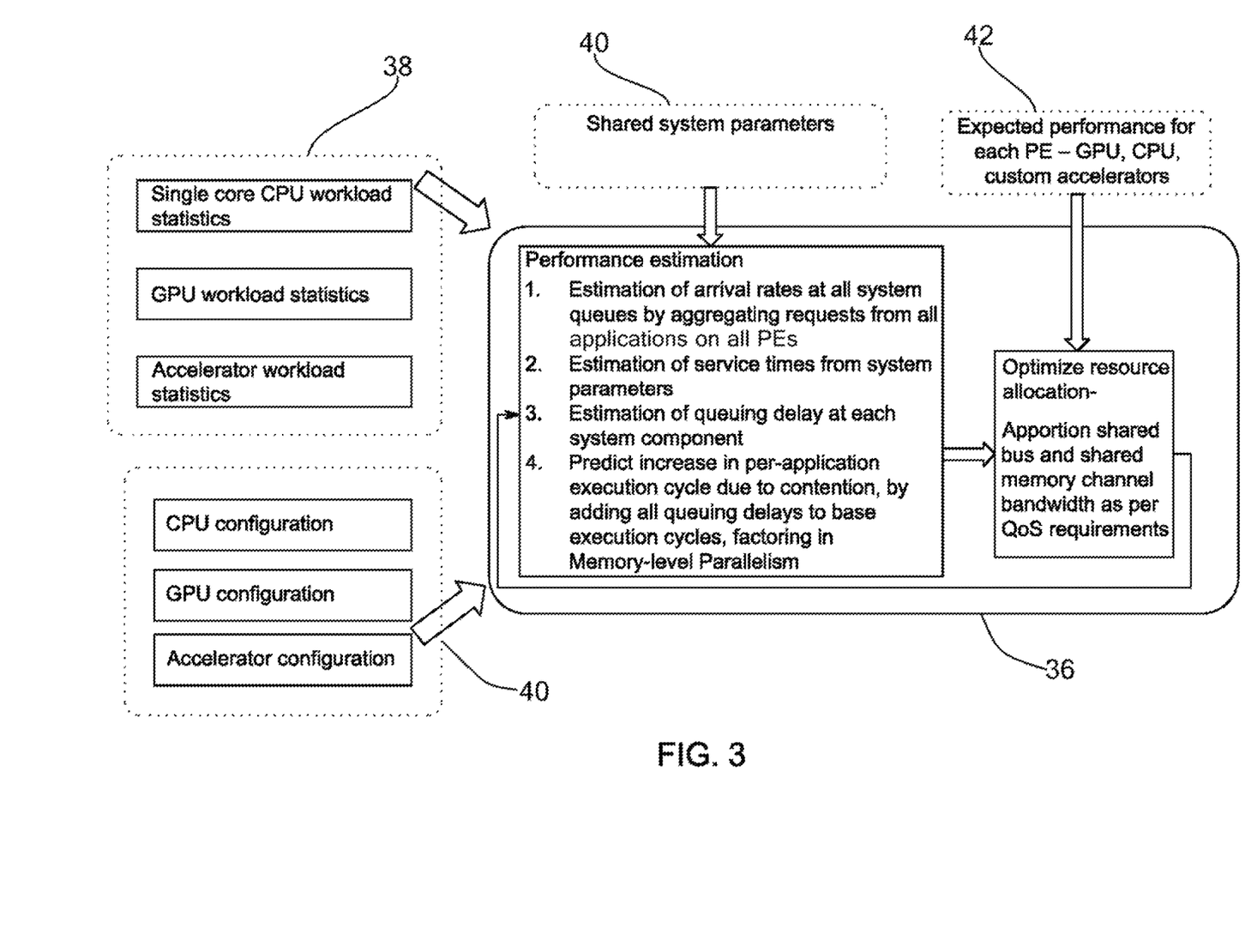
FIG. 3 is an illustration showing various inputs provided to a contention control unit according to an exemplary embodiment of the present disclosure.

Referring now to FIG. 3, a contention control unit 36 can receive various inputs to provide for contention-aware resource provisioning. These inputs can include individual application statistics 38 that may be dynamically measured from performance counters or prior simulation. The individual application statistics 38 can include (1) single core CPU workload statistics such as cache misses at a last level cache (LLC) and infinite cache cycles per instruction (CPI), (2) GPU workload statistics such as cache misses at each level, CPI. Parallelism factors such as the number of warps, threads, and blocks; and (3) accelerator workload statistics such as local memory requests, computation latency, parallelism factors such as the number of concurrent computations and lanes. The inputs to the contention control unit 36 can also include processing element configuration data 40, which may include (1) CPU configuration data, such as cache size and core counts, (2) GPU configuration data, such as device occupancy, GPU multiprocessor count and local memory bandwidth, and (3) accelerator configuration data, such as core count and local bandwidth.

The contention control unit 36 can also receive share system parameters 42, which can include link bandwidths, frequencies, memory access latencies and the number of parallel links/channels. Finally, the contention control unit 36 can receive data 44 related to the expected performance for each processing element, including the GPU, the CPU and custom accelerators.

The contention control unit 36 can perform steps of performance estimation and resource allocation optimization. Performance estimation can include (1) an estimation of arrival rates at all system queues by aggregating requests from all applications on all processing elements, (2) an estimation of service times from system parameters, (3) an estimation of queuing delay at each system component and (4) a prediction of increase in per-application execution cycle due to contention by adding all queuing delays to base execution cycles, factoring in memory-level parallelism (MLP). Once performance estimation is complete, an allocation of the shared bus and shared memory channel bandwidth may be optimized per quality of service requirements.

Figure 4:
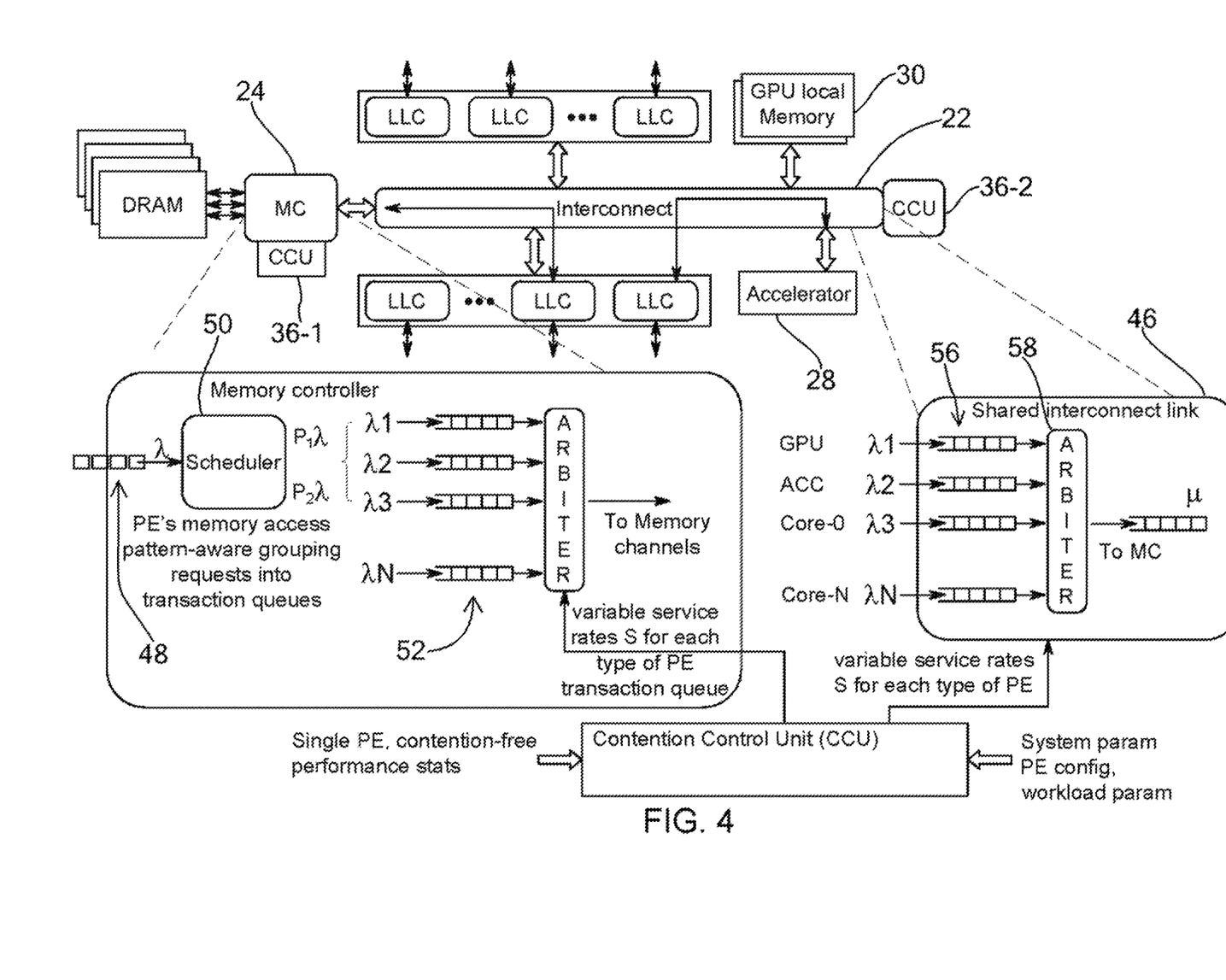
FIG. 4 is a schematic representation showing the integration of a contention control unit into arbiters of a memory controller and shared interconnect link, according to an exemplary embodiment of the present disclosure.
Figure 5:
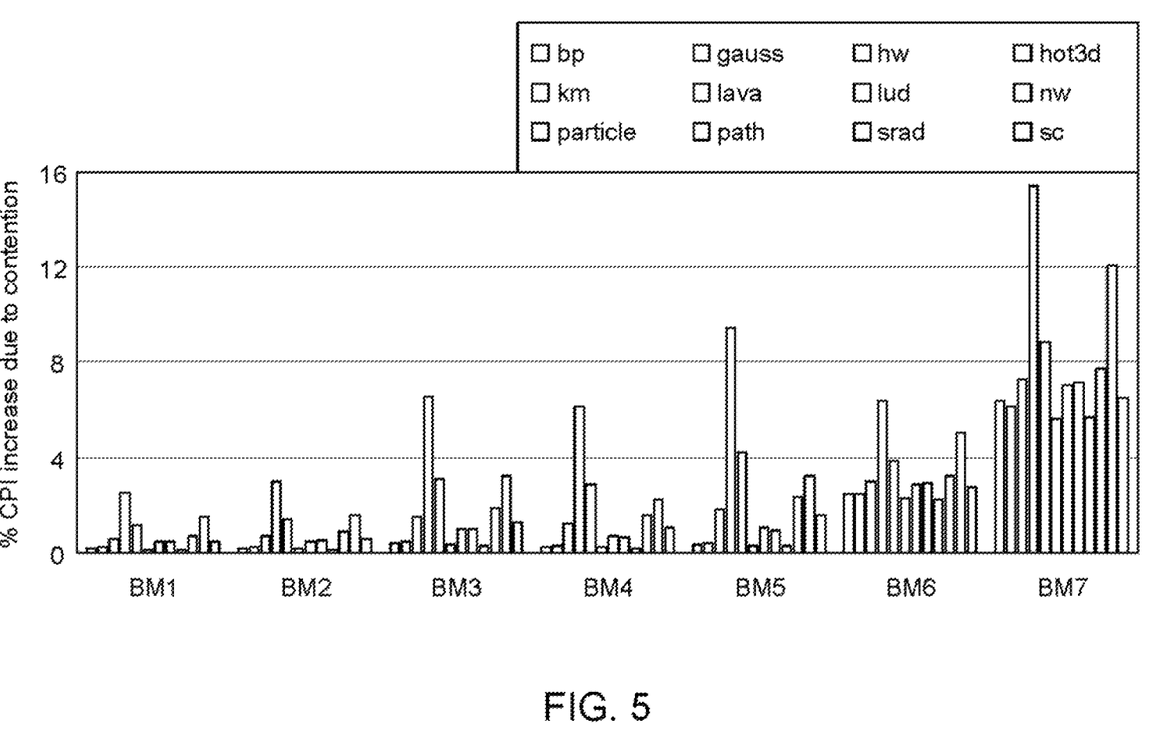
FIG. 5 is a graph illustrating an increase in cycles per instruction of microbenchmarks as estimated by a controller in the presence of requests from graphics processing unit (GPU) workloads.
Figure 6:
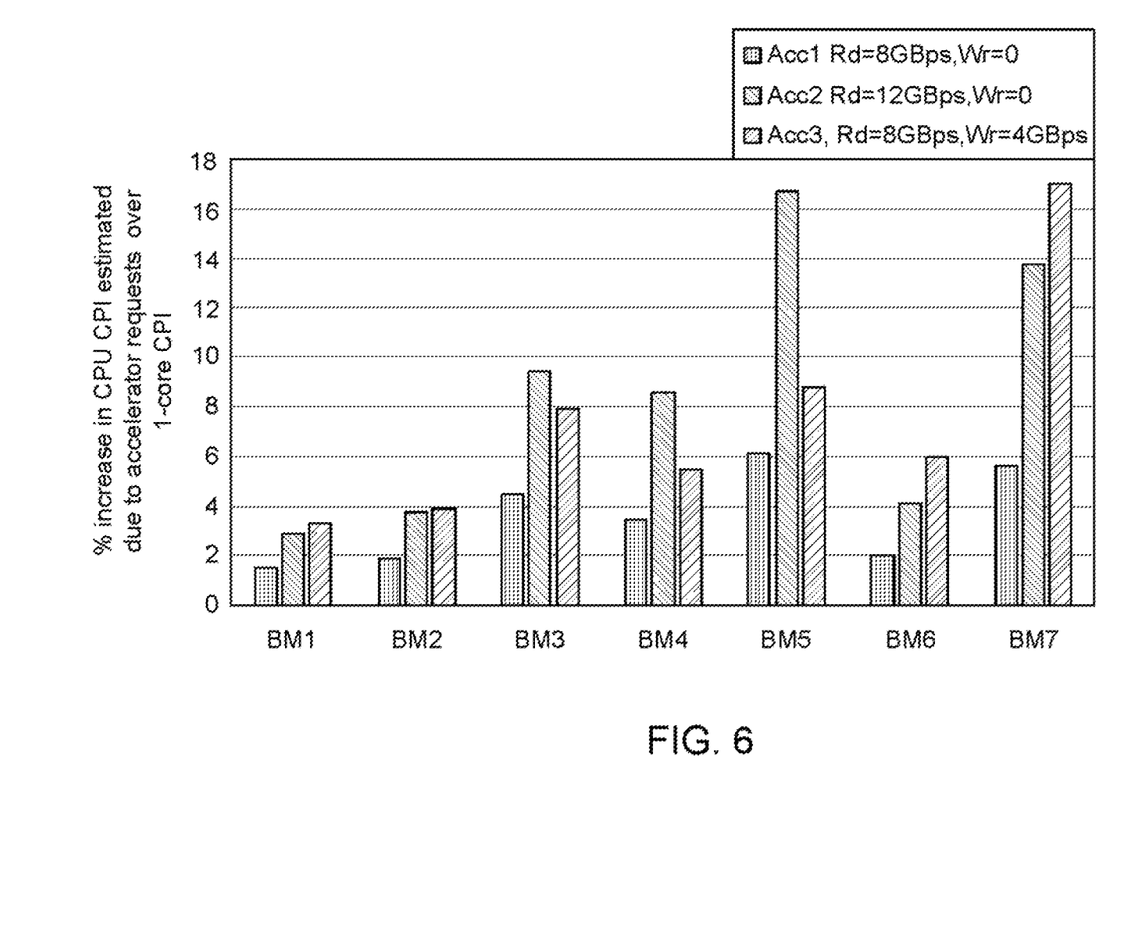
FIG. 6 is a graph illustrating an increase in cycles per instruction of microbenchmarks as estimated by a controller in the presence of requests from an accelerator with different bandwidth requirements.

FIG. 4 illustrates a detailed architecture that includes a contention control unit 36-1 for the memory controller 24 and a contention control unit 36-2 for the shared interconnect link 46 that links the chip to the GPU 30 and the accelerator 28. Data 48 from the interconnect 22 can pass through a scheduler 50, where the processing element's access pattern-aware grouping requests into transaction queues 52. In other words, the data may include data for both the GPU and CPU, where the scheduler 50 can packet the data into distinct transaction queues for each processing element. The contention control unit 36-1 can interact with an arbiter 54 to provide variable service rates, S, for each type of processing element transaction queue based on data collected, as discussed above with reference to FIG. 3.

Similarly, data 56 from each of the processing units can pass to an arbiter 56 that interacts with the contention control unit 36-2 to provide a variable service rate, S, for each type of processing element.

The methodology for the contention control unit 36 is described in greater detail below. The contention control unit 36 may estimate single core performance. This can be achieved by determining stand-alone statistics for each processing element for a small-time quantum for each time interval by giving the highest service rates for each processing element application. It should be noted that the memory intensity can vary across phases for both CPU and accelerator applications.

The contention control unit 36 can provide a performance computation for multiple processing elements with contention. For the multi-processing element performance computation, for queues in shared resources in all nodes, arrival rates can be computed by aggregating traffic from all processing elements (all active CPU cores and accelerators) to that queue. Contention delay in the presence of i cores can be estimated by computing input arrival rates using total cycles (including contention delay) of i−1 cores as in the exemplary procedure, Procedure A, shown below. Queuing delay in each queue can be estimated as M−D−1 queue delay. This delay from each queue can be added to base cycles (stand-alone cycles), factoring in MLP, where Cycles[OnCores,c]+=BaseCycles[c]+StallingRequests[c, n,q]*Delay[n,q]
AccCycles[OnCores]+=AccMLP*AccRequests[n,q] *Delay[n,q]

Procedure A:

---

```
For each time quantum
    For OnCores in 1 to NumCores
        For n in 1 to NumNodes
            For {q in [All queues in Memory controller and shared interconnect links for read and write]}
                For c in 1 to OnCores
                    AccessRate[n,q] += (Requests[c,n,q] / Cycles[OnCores−1, c]) \times CoreFrequency
                EndFor
                AccessRate[n,q] += AccRequests[n,q] / AccCycles[kr,OnCores]
                Delay[n,q] = Qdelay((AccessRate[n,q]),Servicetimes[n,q])
            EndFor
        EndFor
    EndFor
EndFor
```

--- tion. Once the number of requests and processing element-alone cycle times are determined for a given time interval, T, performance can be estimated in the combined processing element's scenario by computing contention queuing delay at the local interconnects, multi-processor interconnects, accelerator interconnects and memory controllers. The performance estimation can be based on simple mathematical models which can be implemented in an energy-efficient, scalable manner in the hardware of the contention control unit.

The contention control unit 36 can then provide performance control or actuation, where the scheduler can be adjusted, and the application can be allocated links and service times depending on the values of queuing delay that match application performance requirements. Details of each of these elements of the contention control unit methodology are described in greater detail below.

For the single core performance estimation, with pre-characterized CPU and GPU applications, stand-alone performance statistics can be obtained from prior simulation. However, in dynamic contention-aware systems, estimation of stand-alone statistics can be challenging since all applications run together and share resources. In order to dynamically collect CPU-alone or GPU-alone statistics, the service rates of a particular CPU core or GPU alone at the interconnect and memory controller are fixed at the maximum for a small-time quantum for each scheduling time interval. Using the maximum service rates for a particular processing element helps ensure the least interference from other processing elements. Here, a factor, f, is the factor by which service rates are varied. To determine the stand-alone performance characteristics, f can be adjusted to the maximum in the formula below:

Sq=f*((linkwidth*linkfrequency)/(transferSize/L)),
where L is the number of links.

With respect to actuation, to meet performance requirements for each type of processing element application, the contention control unit can provide transaction queues of different service rates for each type of processing element. A processing element request can be sent to a queue depending on application characteristics, such as bandwidth-latency sensitivity and memory access patterns. GPU and other custom accelerators typically have high MLP and data parallelism, and overlap computation with memory transfer to hide memory latency. Accelerators often have specific memory access patterns, such as reading a 2-dimensional tile of data rather than a linear row. Therefore, such requests resulting in a specific access pattern can be processed as an optimized group and can have different service times. The service rates of each queue can be adjusted such that expected performance deadlines are met. The contention control unit can provide actuation periodically throughout the execution time of an application in order to minimize contention while maintaining quality of service.

FIGS. 7A and 7B are graphs that can be used to validate the performance estimation discussed above. FIG. 7A shows an increase in CPI of microbenchmarks as estimated by the contention control unit in the presence of requests from GPU workloads for a particular processor. FIG. 7B shows an increase in CPI of microbenchmarks as estimated by the contention control unit in the presence of requests from an accelerator with different bandwidth requirements. A first accelerator, Acc 1, can have a read requirement of 8 GBps, and a write requirement of zero. A second accelerator, Acc2, can have a read requirement of 12 GBps and a write requirement of zero. A third accelerator, Acc3, can have a read requirement of 8 GBps and a write requirement of 4 GBps.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for contention-aware resource provisioning in heterogeneous processors, the method comprising:
    receiving stand-alone performance statistics for each processing element for a given application;
    computing one or more multi-core performance slowdown parameters from the received stand-alone performance statistics;
    receiving a request to provision an application on heterogeneous processors;
    determining application performance requirements of the application;
    provisioning a bandwidth for the application based on the application performance requirements and the computed one or more multi-core performance slowdown parameter; and
    estimating contention delay in the presence of i cores by computing input arrival rates using total cycles of i−1 cores.

2. The method of claim 1, wherein the provisioning of the bandwidth for the application includes forming transaction queues of different service rates for each of the processing elements.

3. The method of claim 1, further comprising estimating performance in multi-core, multi-accelerator systems from single core standalone performance statistics by analyzing global effects of contention across all shared resources.

4. The method of claim 1, further comprising estimating queuing delay in each queue and adding the queuing delay from each queue to stand-alone execution cycles.

5. The method of claim 1, wherein collecting stand-alone performance statistics includes dynamically collecting at least one of CPU-alone and accelerator-alone statistics.

6. The method of claim 5, wherein service rates of a particular CPU core or accelerator alone at an interconnect and a memory controller are fixed at a maximum for a time quantum for each scheduling time interval.

7. The method of claim 1, further comprising estimating performance for each processing element by including contention delay at memory controllers, multi-processor interconnects and accelerator interconnects.

8. The method of claim 1, further comprising dynamically apportioning shared resource bandwidth based on application performance requirements and estimated slow-down due to contention.

9. A device, comprising:
    a contention control unit, comprising:
        a monitor configured to collect performance statistics for each processing element for a given application;

a performance estimator configured to compute one or more multi-core performance slowdown parameters from single-core performance statistics collected by the monitor; and a resource allocator configured to provision bandwidth based on performance requirements of an application running on a system using the contention control unit, and the computed one or more multi-core performance slowdown parameter, wherein service rates of a particular CPU core or accelerator alone at an interconnect and a memory controller are fixed at a maximum for a time quantum for each scheduling time interval of the particular CPU core or accelerator.

10. The device of claim 9, wherein the performance estimator is further configured to estimate performance in multi-core, multi-accelerator systems from single core standalone performance statistics by analyzing global effects of contention.

11. The device of claim 9, wherein the monitor is configured to dynamically collect at least one of CPU-alone and accelerator-alone statistics.

12. The device of claim 9, wherein the performance estimator is further configured to estimate performance for each processing element by including contention delay at memory controllers, multi-processor interconnects and accelerator interconnects.

13. The device of claim 9, wherein the resource allocator is configured to dynamically apportion shared resource bandwidth based on application performance requirements and estimated slow-down due to contention.

14. A non-transitory computer program product for contention-aware resource provisioning, the computer program product comprising:

a computer readable storage medium having program instructions embodied therewith, the program instructions executable by a contention control unit to cause the contention control unit to:

receive stand-alone performance statistics for each processing element for a given application;

compute one or more multi-core performance slowdown parameters from the received stand-alone performance statistics; and receive a request to provision an application on heterogeneous processors;

determine application performance requirements of the application;

estimate contention delay in the presence of i cores by computing input arrival rates using total cycles of i−1 cores; and provision a bandwidth for the application based on the application performance requirements and the computed one or more multi-core performance slowdown parameters.

15. The non-transitory computer program product of claim 14, wherein execution of the program instructions further causes the contention control unit to form transaction queues of different service rates for each of the processing elements.

16. The non-transitory computer program product of claim 14, wherein execution of the program instructions further causes the contention control unit to dynamically collect at least one of CPU-alone and accelerator-alone statistics.

17. The non-transitory computer program product of claim 14, wherein execution of the program instructions further causes the contention control unit to estimate performance for each processing element by including contention delay at memory controllers, multi-processor interconnects and accelerator interconnects.

18. The non-transitory computer program product of claim 14, wherein execution of the program instructions further causes the contention control unit to dynamically apportion shared resource bandwidth based on application performance requirements and estimated slow-down due to contention.

* * * * *